March 14, 1944.  J. W. BRUNDAGE  2,343,881
PRESS
Filed April 25, 1940  5 Sheets-Sheet 1

INVENTOR.
JAMES W. BRUNDAGE
BY Oberlin, Limbach & Day
ATTORNEYS.

March 14, 1944. J. W. BRUNDAGE 2,343,881
PRESS
Filed April 25, 1940 5 Sheets-Sheet 2

INVENTOR.
JAMES W. BRUNDAGE
BY Oberlin, Limbach + Day
ATTORNEYS

March 14, 1944.   J. W. BRUNDAGE   2,343,881
PRESS
Filed April 25, 1940   5 Sheets-Sheet 3

INVENTOR.
JAMES W. BRUNDAGE
BY Oberlin, Limbach + Day
ATTORNEYS.

March 14, 1944. J. W. BRUNDAGE 2,343,881
PRESS
Filed April 25, 1940 5 Sheets-Sheet 4
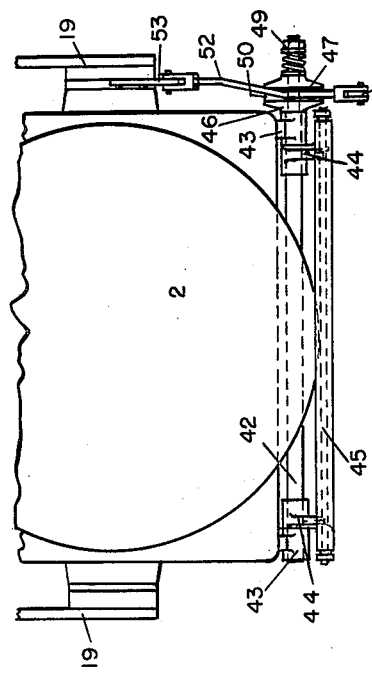
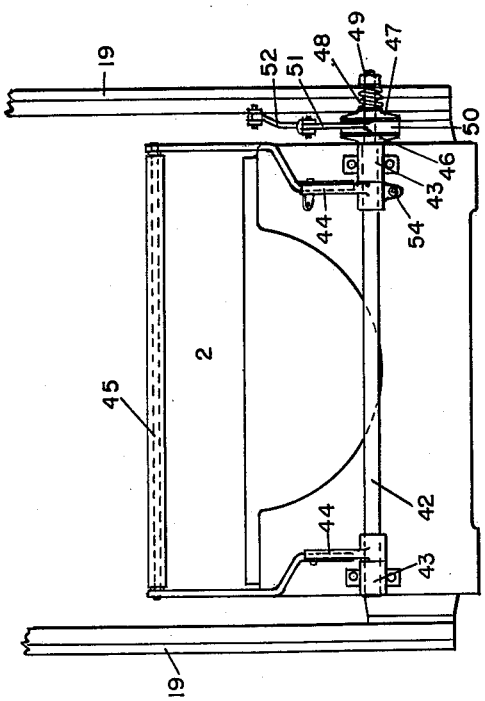
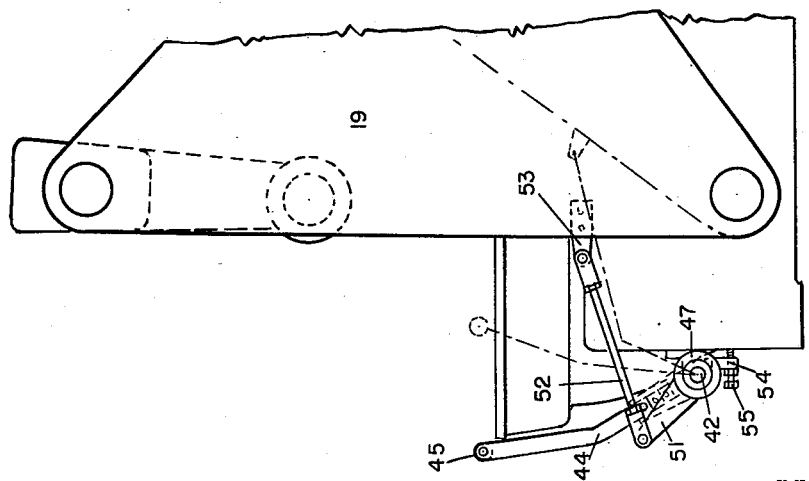
INVENTOR.
JAMES W. BRUNDAGE
BY Oberlin, Limbach + Day
ATTORNEYS March 14, 1944.  J. W. BRUNDAGE  2,343,881
PRESS
Filed April 25, 1940　　5 Sheets-Sheet 5

INVENTOR.
JAMES W. BRUNDAGE
BY Oberlin, Limbach & Day
ATTORNEYS.

Patented Mar. 14, 1944

2,343,881

UNITED STATES PATENT OFFICE 2,343,881

PRESS

James W. Brundage, Akron, Ohio, assignor, by mesne assignments, to The McNeil Machine and Engineering Company, Akron, Ohio, a corporation of Ohio Application April 25, 1940, Serial No. 331,543

23 Claims. (Cl. 18—17)

This invention relates as indicated to presses and more particularly to the type of press employed for the purpose of curing articles such as those composed of rubber and the like. The presses of the present invention are designed primarily for the purpose of curing articles such as automobile tire casings which are, during the curing operation, supported in the matrix of complementary mold sections which, during the loading of the green tire and unloading of the cured tire, are moved relatively to each other to open and close the press. The present invention is concerned particularly with the means for actuating the mold sections and supporting the same during the curing operation.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative however of but a few of the various ways in which the principle of the invention may be employed.

In said annexed drawings:

Fig. 6 is a fragmentary and elevational view of the press illustrated in Fig. 1 showing particularly the construction of an auxiliary apparatus associated with such press for the purpose of facilitating removal of the cured article therefrom;

Fig. 7 is a front elevational vew of the apparatus illustrated in Fig. 6;

Fig. 8 is a plan view of the apparatus illustrated in Fig. 7;

Figure 1:
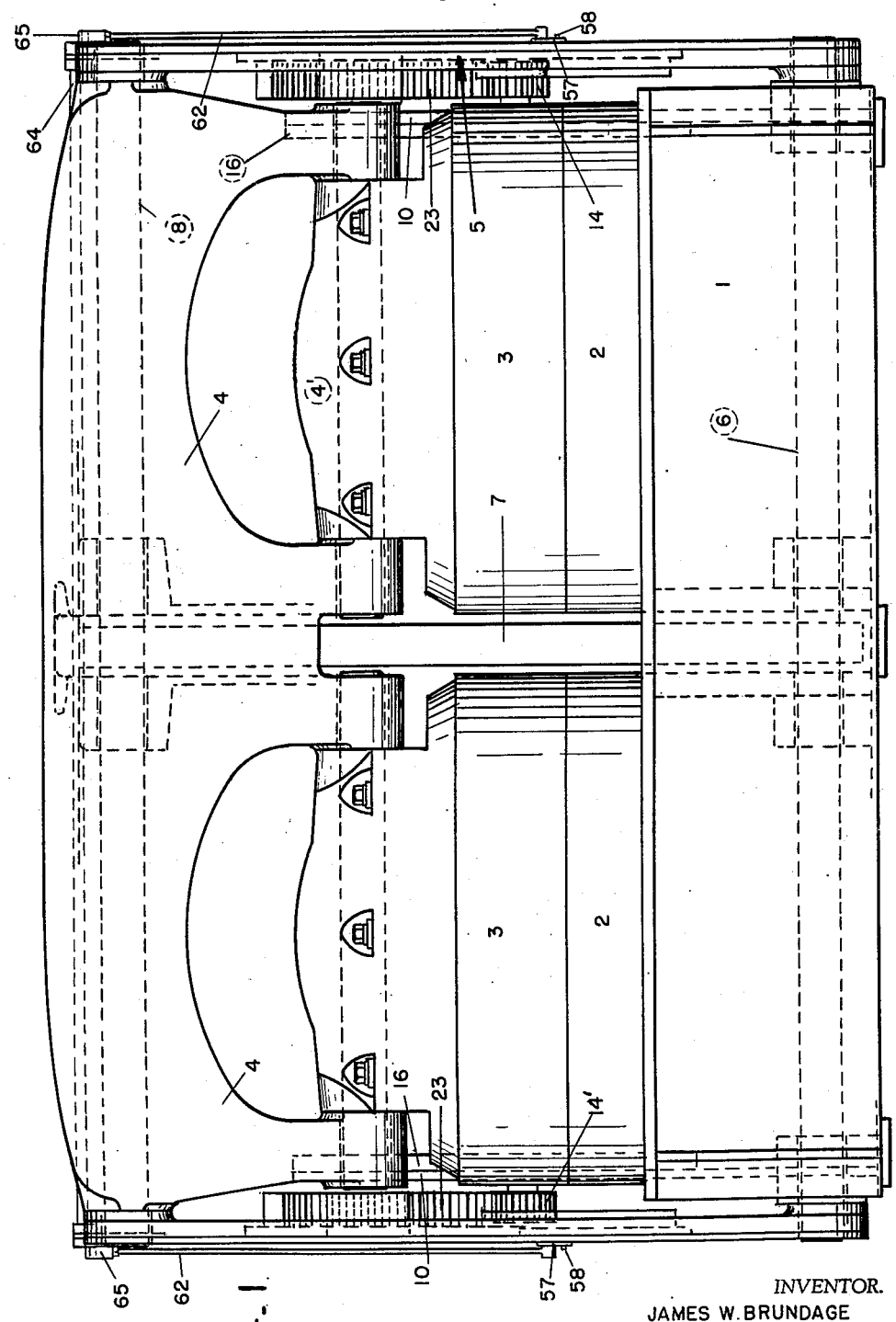
Fig. 1 is a front elevational view of a press showing one embodiment of the principles of my invention.

Referring now more specifically to the drawings, and more especially to Fig. 1, the press here, as illustrated as one embodiment of the principles of my invention, is a dual press in that it includes two pairs of separable mold sections and thus may simultaneously cure two tires or similar articles. Certain features of this invention are particularly applicable to dual presses of this character, whereas certain other features have general utility, i. e., are useful in either single or multiple presses. The press illustrated in Fig. 1 consists of a base generally indicated at 1 which supports a pair of stationary mold sections 2 adapted to operate in conjunction with a pair of complementary mold sections 3 in defining curing cavities within which the article is supported during the curing operation. The movable mold sections 3 are carried by a head actuating member 4 on shafts 4' which extend through the upper parts of the mold sections. The member 4 is in turn supported and actuated by a side strain arm assembly generally indicated at 5, the construction and operation of which will be presently described in detail in connection with the description of Figs. 2 to 5.

The base 1 has a shaft 6 journalled therein to which are secured the side strain arms as well as a central strain arm 7 which, at its upper end, is connected to the head actuating member 4 by being journalled on the shaft 8 which passes therethrough and which, at its end, provides trunnions to which the side strain assemblies 5 are connected.

Figure 2:
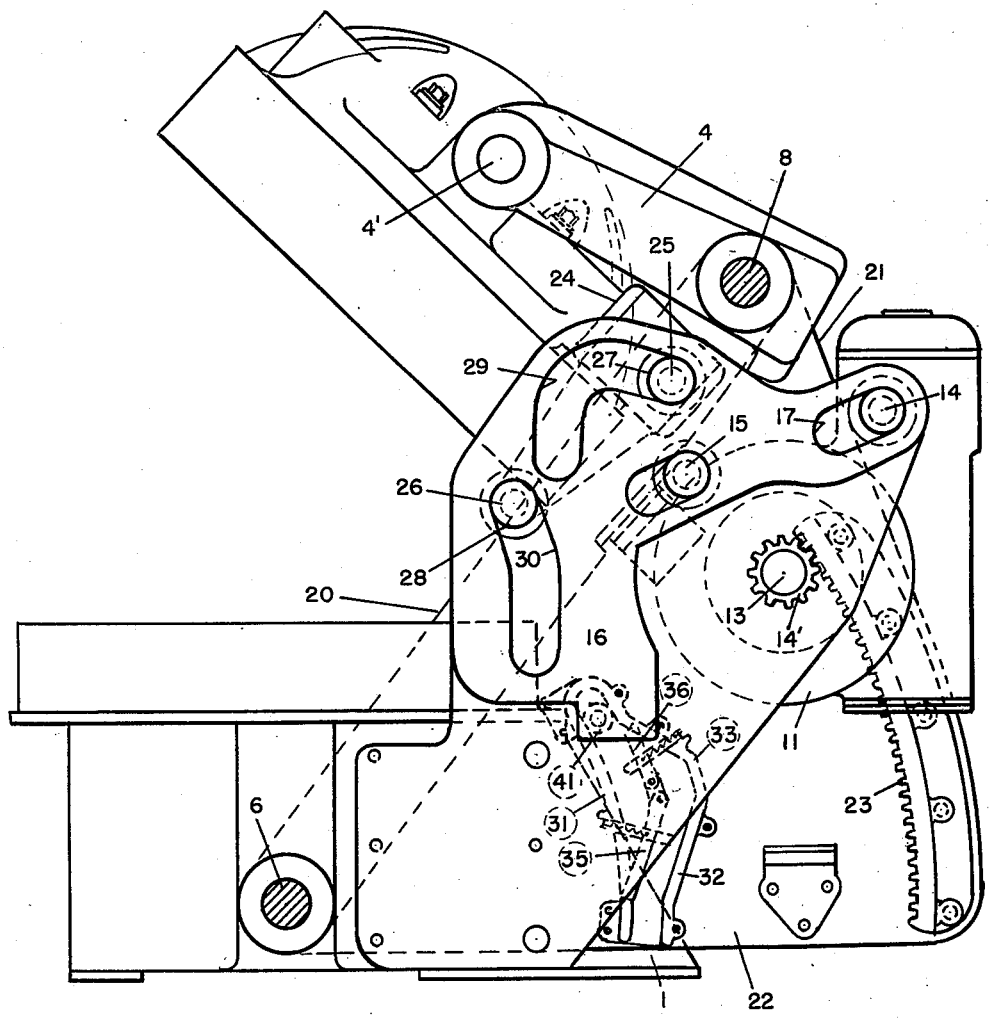
Fig. 2 is a side elevational view of the press illustrated in Fig. 1 but with one of the end strain arms removed to more clearly show the construction of certain of the actuating mechanism normally hidden thereby.
Figure 3:
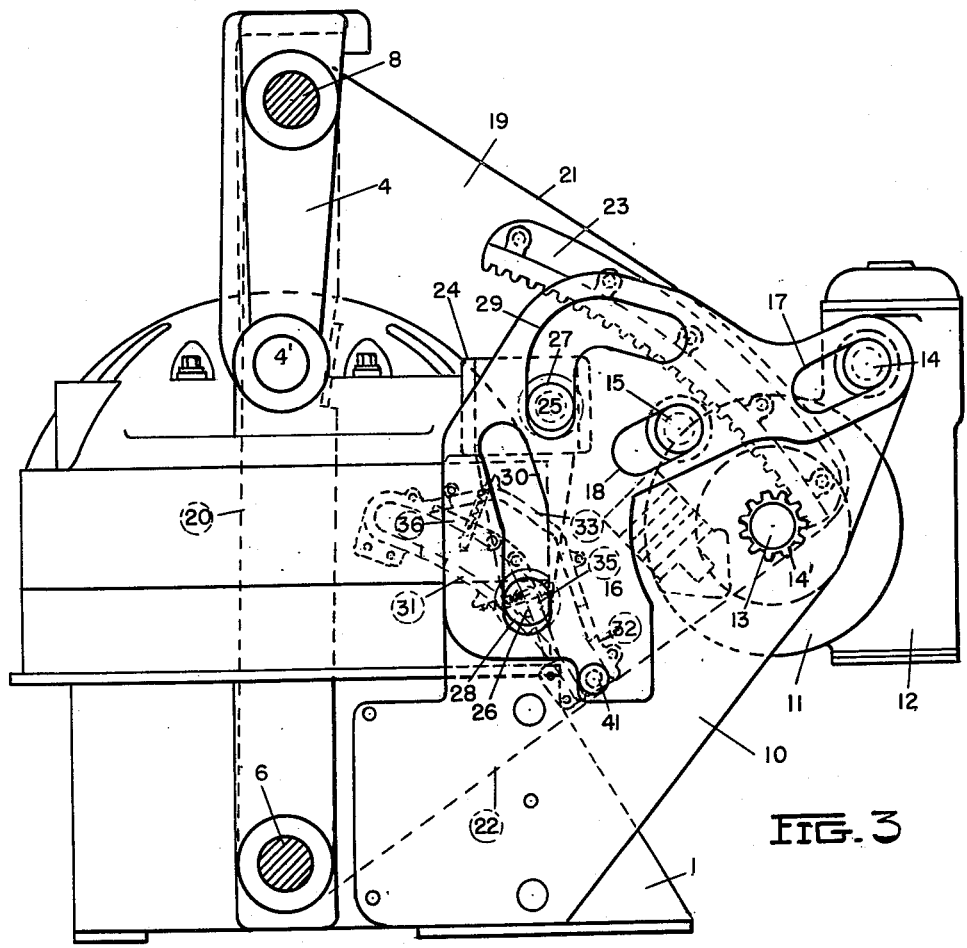
Fig. 3 is a view similar to Fig. 2 but showing the press in closed position in counter-distinction to the open position illustrated in Fig. 2.

As indicated, Figs. 2 and 3 are substantially identical merely differing in the relative location of the various parts. By having reference to Figs. 2 and 3, it will be observed that the base 1 of the press carries, at opposite ends thereof, stationary side plates 10 between which is supported a differential gear housing generally indicated at 11 and a motor-speed reducing combination generally indicated at 12. The construction of the differential gear housing and its mode of association with the side plates 10 is the same as that illustrated and described in detail in my copending application, Serial Number 245,726 filed Dec. 14, 1938, and will, therefore, not be explained in greater detail. Suffice it to say that from each end of such differential gear housing there projects a drive shaft 13 to which is secured a pinion 14'. The upper end of each of the side plates 10 carries a stub shaft 14. Another stub shaft 15, slightly to the left of the stub shaft 14 as viewed in Figs. 2 and 3, is also carried by each of the side plates 10.

An auxiliary side plate 16 is movably supported on each of the side plates 10 by means of slots 17 and 18 through which the stub shafts 14 and 15 project. It may be well to indicate that the upper edge of the auxiliary side plate 16 conforms to the upper edge of the stationary side plates 10 although, as indicated, the auxiliary side plates and the main plates are separate and relatively movable.

Mounted on each end of the shaft 6 is a triangular shaped main strain arm 19. In order to facilitate identification of the same on the drawings, it will be observed that in Fig. 2 such strain arm is mounted by an inclined line 20 extending upwardly and to the right from adjacent the shaft 6, then by another line 21 extending downwardly and to the right from adjacent the shaft 8, and then by another line 22 which extends substantially horizontally. Similar reference characters are employed to designate the same lines in Fig. 3.

The strain arm 19 is pivotally secured at one corner to the shaft 6, and at another corner to the shaft 8. To the inner face of each triangularly shaped strain arms 19 is secured a rack 23, the toothed surface thereof being formed on the arc of a circle, the center of which is the axis of the shaft 6. The rack 23 is so mounted on the strain arm 19 as to be in meshing engagement with the pinion 14.

A bracket, generally indicated at 24, is secured to the outer rear corner of each of the movable press heads, and carries two stub shafts 25 and 26 on which are mounted rollers 27 and 28 respectively. The rollers 27 and 28 are positioned in slots 29 and 30 respectively which are formed in the auxiliary side plate 16. These slots serve as cam guides in guiding the path of movement during opening and closing of the upper press head 3.

Figure 4:
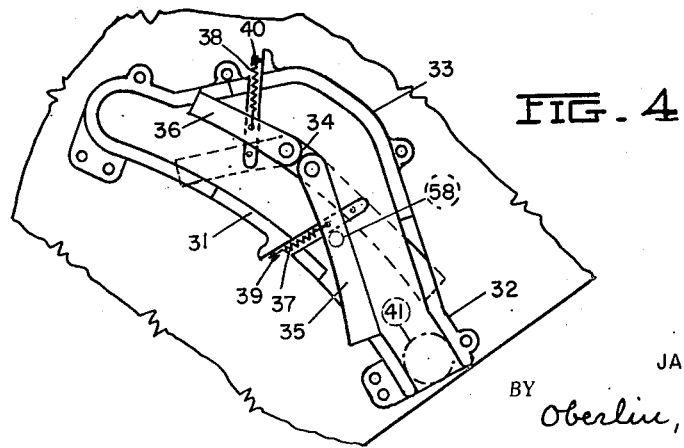
Fig. 4 is a fragmentary view drawn to an enlarged scale of a portion of the apparatus illustrated in Fig. 2 and 3 and employed particularly for the purpose of actuating the mold shifting device which operates during the opening and closing movement of the press.

Mounted on the inner face of each of the triangularly shaped strain arms 19 is a cam track, the construction of which is most clearly illustrated in Fig. 4. This cam track comprises a lower portion 31 which is formed on the arc of a circle, the center of which lies on the axis of the shaft 6. It also includes an upper track 32, the end portions of which are formed on the arc of a circle, the center of which lies on the axis of the shaft 6 with an intermediate portion 33 which extends outwardly from such arc. An abutment 34 is mounted on the strain arm plate 19 intermediately of the two cam tracks 31 and 33 and pivotally supports gates 35 and 36. The gates 35 and 36 are resiliently maintained in their full line positions as illustrated in Fig. 4 by springs 37 and 38 respectively, such springs being at one end secured to the gates and at their other ends to pins 39 and 40 carried by lateral projections of the cam tracks 31 and 33 respectively.

The auxiliary side plates 16 each carry a stub shaft on which is mounted a roller 41 adapted to operate between the cam tracks 31 and 32, and through such cam tracks, shift the auxiliary side plate 16 with respect to the main plates 10 as the press is opened and closed.

The operation of the opening and closing apparatus described thus far is as follows, with particular reference to Figs. 2 and 3:

In Fig. 2, the press is, of course, in the open position with the roller 41 in the upper portion of the cam track 31. Now, as the press is closed, the shaft 13 will be driven in a counter-clockwise direction resulting in driving the rack 23, and the triangular shaped side strain member 19 to which it is attached, likewise in a counter-clockwise direction. As the triangular shaped side strain member 19, which carries the cam assembly of Fig. 4, moves in a counter-clockwise direction carrying the same with it, the roller 41 will pass under the gate 36 and also under the gate 35 forcing the latter upwardly into its dotted line position, as illustrated in Fig. 4, against spring 37. The roller, therefore, follows the cam track 31 which, as explained, is arcuate with its center at the axis of the shaft 6 so that the auxiliary side plate 16 will not be displaced relatively to the side plate 10 from the position illustrated in Fig. 3. In other words, the rollers 27 and 28 are caused to follow the slots 29 and 30 which, it will be observed, are so formed that during the early stages of movement the roller 27 moves forwardly while the roller 28 moves downwardly and slightly rearwardly. Thus, during the early stages of closing movement, the upper head 3 is first moved into a position parallel with the lower head, whereupon the rollers, moving in the lower ends of each of the cam slots 29 and 30, causes the press to close by relative rectilinear movement between the two press heads.

Now, when the press is to be opened, the parts are first in the position illustrated in Fig. 3 with the roller 41 at the right hand end of the cam track 31. The pinion 14 will be actuated for rotation in a clockwise direction and a consequent rotation in a similar direction of the triangular side strain member 19. The cam assembly of Fig. 4 is then carried in a clockwise direction about the axis of shaft 6, and the roller 41 caused to advance from the right hand end of the cam track 31 to the left hand end thereof. The gate 35 now leads the roller 41 upwardly so that it is virtually forced to follow the outline of the cam track 33 in passing from the right hand end of the track 32 to the left hand end thereof. It will, therefore, be observed that the roller 41 which is mounted on the auxiliary side plate 16 forces such auxiliary side plate upwardly and to the rear in a direction determined by the slope of the cam slots 17 and 18. It will be observed that shifting of the auxiliary side plate 16 in the manner described results in a shifting of the guiding cam slots 29 and 30 so that the path of opening movement of the press is not a reversal of the closing movement as described. Instead, the press opens slightly by relatively rectilinear movement between the mold sections until the roller 41 strikes the inclined surface of the gate 35, whereupon the upper mold section is shifted laterally, i. e., to the rear with respect to the stationary mold section 2, such shifting movement continuing simultaneously with the movement of the mold section 3 away from the mold section 2 until the abutment 34 is reached by the roller 41 whereupon the auxiliary side plate 16 is moved back toward its full line position as illustrated in Fig. 2 until such position is reached near the end of the opening movement.

From this description it will be observed that when a cured article such as a rubber tire, provided with non-skid tread configurations on the surface thereof, is vulcanized, the projections on the matrix faces of the molds will grasp the intermediate projections on the tire and automatically loosen the same from both the upper and lower mold section, and the tire is thus automatically stripped during the opening movement of the press.

Figure 5:
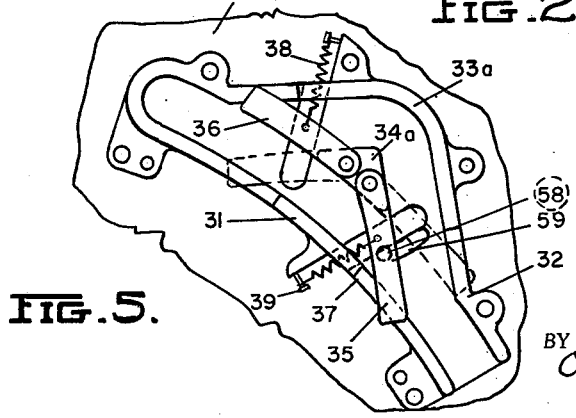
Fig. 5 is a view similar to Fig. 4 but showing a modification of the structure illustrated in Fig. 4.

The cam assembly illustrated in Fig. 5 differs from that illustrated in Fig. 4 only in that the abutment 34a of the construction illustrated in Fig. 5 is provided with a sharp corner, and the intermediate section 33a of the upper cam track is modified accordingly so as to more sharply return the auxiliary side plate 16 to its full line position as illustrated in Figs. 2 and 3 than the gradual manner in which such return is made by the structure illustrated in Fig. 4. Since, otherwise, the two cam assemblies are the same, similar reference characters will be employed to designate like parts in order to facilitate comparison of the two structures. Now, when a cured tire has been stripped from the mold sections during the opening movement of the press, it usually has a tendency to fall back into the lower mold section to become more or less securely lodged therein unless some means is provided for preventing this. To this end I have provided the construction illustrated in Figs. 6 to 8 which, for simplicity in determination and description, has been shown associated with a single mold rather than with both the molds illustrated in Fig. 1. Obviously, the application of a similar device to the second mold would be a mere duplication of that required for the first mold so that an illustration of the application of the same to both molds is believed unnecessary.

As illustrated in Figs. 6, 7 and 8, a shaft 42 is rotatably supported in bearing brackets 43 on the base of the press, and to such shaft are keyed upwardly extending arms 44 between which, at their upper ends, is supported a roller 45 of such length as to span the face of the lower mold section 2.

Fixed on the shaft 42 is a friction member 46 and facing it is a similar friction member 47, the latter being resiliently urged toward the friction member 46 by means of a spring 48 which is backed up by a rod 49 secured to the shaft 42. Loosely mounted on the shaft 42 intermediately of the opposed faces of the friction members 46 and 47 is an annular member 50 adapted to frictionally engage the faces 46 and 47 and provided with a laterally extending arm 51 to the end of which is secured an adjustable link 52. The link 52 is pivotally anchored at its other end to a bracket 53 which is mounted on one edge of the triangular shaped side strain member 19.

One of the brackets 44 carries a depending arm 54 through which passes a set screw 55 adapted at its free end to engage the base of the press. The adjusting screw 55 is employed for the purpose of positioning the angular relation of the shaft 42 and accordingly the position of the roller 45 when the press is in the fully closed position, and consequently the extent to which the roller 45 is moved across the face of the lower mold section, may be likewise adjusted. The position of the various parts, as illustrated in full lines in Fig. 6, is that which they occupy when the press is in the closed position. In order to simplify illustration of the construction and operation of the roller 45, the upper press head has been omitted in Figs. 6 to 8. Now, when the press is opened, such opening movement is accompanied by a clockwise rotation of the triangular shaped side strain arm 19 in the manner previously explained. Clockwise movement of the member 19 will result in the link 52, through the friction connection described, urging the roller 45 against the front edge of the tire in the area where it intersects the matrix of the lower mold section. As soon as the upper mold section moves rearwardly and upwardly in the manner described due to a shifting of the auxiliary side plate 16, the roller 45 will move under the tire, i. e., across the matrix face of the lower mold section, and as the tire drops out of the upper mold section, it merely falls onto the roller 45, and, therefore, does not lodge in the lower mold section. The tire resting on the roller 45 may, therefore, be very easily removed from the press and the roller 45 also facilitates positioning of a green tire in the lower mold section preparatory to the next curing cycle.

The construction illustrated in Fig. 1, i. e., that characterized by the employment of an intermediate strain arm 7, has been found of considerable importance in that construction and operation of the press, in a fully accurate manner, is considerably facilitated. In other words, the base 1 on which the lower mold sections rest may be accurately constructed in a single plane, and the various openings through the legs of the member 4 may be accurately measured so as to insure that the mold sections will fully and uniformly close onto each other as the press is closed. The auxiliary strain arm 7 prevents any deformation in the long beam span, of the member 4, and even though severe loads are placed thereon makes it possible to maintain within narrow limits the amount of such deformation.

Figure 9:
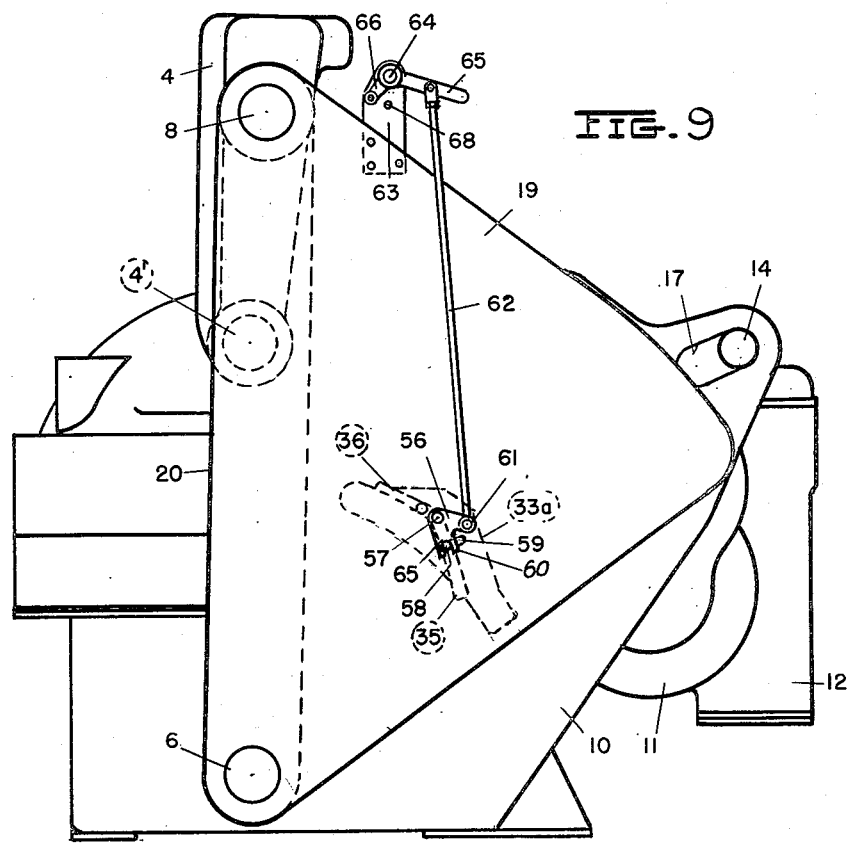
Fig. 9 is an end elevational view of the press illustrated in Fig. 1 showing more particularly the construction and arrangement of the coordinating device for the cam plate operating mechanism positioned on each end of the press.
Figure 10:
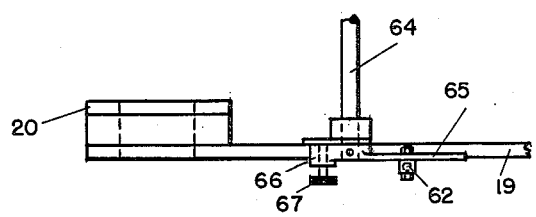
Fig. 10 is a fragmentary plan view of a portion of the apparatus illustrated in Fig. 9.

In Figs. 9 and 10, there is illustrated a coordinating device for the gates 35 on opposite ends of the press, such device insuring that each of the gates 35 is, at all times, in the same position. Thus, for example, when the press closes and the roller 41 moves toward the lower right-hand end of the cam slot, as illustrated in Fig. 4, it passes out from under the gate 35. If, for some reason, the parts in the press should be slightly misaligned, it might happen that the roller 41 on one end of the press would pass completely out from under the gate 35, whereas the roller 41 on the other end of the press might not yet have cleared its associated gate. If the press were opened, the auxiliary side plate on one side of the press would be shifted, and the auxiliary side plate on the other side of the press permitted to remain stationary. This would result in the placing of very severe strains on the press, and a possible breakage or warpage of parts thereof.

This disadvantage is overcome, and further advantages achieved, by the apparatus which is illustrated in Figs. 9 and 10. Such apparatus consists of a bell crank 56 mounted on a stub shaft 57 carried by the side plate 19. The gate member 35 is provided with a pin 58 which projects through a slot 59 in the side plate 19. The forked end 60 of the bell crank 56 engages the pin 58, and the other arm 61 of such bell crank has a lever 62 pivotally secured thereto.

The side plates 19, at opposite ends of the press, have upstanding brackets 63 mounted thereon. Rotatably mounted in the bracket 63 is a shaft 64 which extends from one end of the press to the other end, on the ends of which are secured bell cranks 65. The rods 62 on opposite ends of the press are, at the upper ends, each connected to one arm of the bell crank 65, so that the movement of one of the gate members 35 will be transmitted to the other side of the press through the rod 64, and there, by mechanism similar to that illustrated in Fig. 9, similar movement will be imparted to the gate member 35 at the other end of the press.

One arm 66 of the bell crank 65 is provided with a removable pin 67 which, for certain positions of the bell crank, may be inserted in an opening 68 provided in the bracket 63, for the purpose of locking the ball crank in a particular position. It will be observed that, when the pin 67 is in the hole 68, the gate member 35 will be locked in its upper position, so that the course which the rollers 41 must follow, for both opening and closing movement, is a true arcuate path. Thus, by locking the gate member 35 in the position just described, the opening and closing movement for the press is identical, i. e., there will not be any lateral shifting of the movable mold section during the opening movement of the press which occurs when the gate members 35 are permitted to operate and cause the rollers 41 to deviate from a true arcuate path in their movement from one end of the cam of Fig. 4 to the other end of such cam.

The various advantages and uses of the apparatus above described will be fully understood by those familiar with the art so that a further enumeration thereof at this point is believed unnecessary.

Other modes of applying the principle of the invention may be employed, change being made as regards the details described, provided the features stated in any of the following claims or the equivalent of such be employed.

I, therefore, particularly point out and distinctly claim as my invention:

1. The combination with the movable head in a press, of guiding means therefor comprising a stationary member, a guide member movably supported on said stationary member, an arm for moving said head, means responsive to movement of said arm for shifting said guide member relatively to said stationary member, said last named means comprising a cam and follower, said cam being provided with a gate whereby said follower is laterally displaced during one direction only of relative movement between said cam and follower, and means connecting said head to said guide member for transmitting movement of said guide member to said head.

2. The combination with a movable head in a press, of guiding means therefor comprising a stationary member, a guide member, provided with cam slots and movably supported on said stationary member, an arm for moving said head, means responsive to movement of said arm for shifting said guide member relatively to said stationary member, said last named means comprising a cam and follower, said cam provided with a gate whereby said follower is laterally displaced during one direction only of relative movement between said cam and follower, and means carried by said head having engagement in said slots in said guide member for transmitting movement of said guide member to said head.

3. In a vulcanizer press, a fixed supporting structure, a pair of relatively movable complementary press heads, supporting and actuating means for one of said press heads comprising means for moving such head toward and away from the other head, a movable auxiliary guiding member, means connecting said auxiliary member to said supporting structure for supporting the same and guiding the path of movement thereof with respect to said supporting structure, and means interconnecting said auxiliary member and said movable press head for guiding the path of relative movement therebetween.

4. In a vulcanizer press, a fixed supporting structure, a pair of relatively movable complementary press heads, supporting and actuating means for one of said heads comprising a pair of side arms pivotally secured to said supporting structure and connected with one of said heads, a movable auxiliary guiding member, means interconnecting said supporting structure and auxiliary member guiding the movement of the latter with respect to the former, means interconnecting said movable press head and said auxiliary member guiding the movement of the former with respect to the latter, and means for actuating said side arms.

5. In a vulcanizer press, a fixed supporting structure, a pair of relatively movable complementary press heads, supporting and actuating means for one of said heads comprising a pair of side plates connected to said supporting structure, a pair of side arms pivotally secured to said supporting structure and connected with one of said heads, movable auxiliary guiding plates, cooperative cam tracks and guides associated with said auxiliary and side plates determining the position of said auxiliary plates with respect to said side plates, cooperative cam tracks and guides associated with said auxiliary plates and said last named press head determining the position of the latter with respect to the former, and means for moving said side arms relatively to said side plates.

6. In a vulcanizer press, a fixed supporting structure, a pair of relatively movable complementary press heads, supporting and actuating means for one of said press heads comprising means for moving such head toward and away from the other head, a movable guiding member, means connecting said guiding member to said supporting structure operable to permit a guided rectilinear movement of said guiding member relative to said supporting structure and to prevent rotational movement thereof with respect thereto, and means connecting said guiding member to said movable press head for guiding the movement of said movable press head relative to said guiding member.

7. In a vulcanizer press, a fixed supporting structure, a pair of relatively movable complementary press heads, supporting and actuating means for one of said press heads comprising means for moving such head toward and away from the other head, a movable guiding plate, cooperative cam tracks and guides associated with said guiding plate and said supporting structure operable to permit a guided rectilinear movement of said guiding plate relative to said supporting structure and to prevent rotational movement thereof with respect thereto, and cooperative cam tracks and guides associated with said guiding plate and movable press head for guiding the movement of said movable press head relative to said guiding member.

8. In a vulcanizer press, a fixed supporting structure, a pair of relatively movable complementary press heads, supporting and actuating means for one of said press heads comprising means for moving such head toward and away from the other head, a movable guiding plate, cooperative cam tracks and guides associated with said guiding plate and supporting structure determining the position of said guiding plate with respect to said supporting structure, means functionally responsive to opening movement of the press for imparting movement to said guiding plate, and means connecting said guiding plate to said movable press head operable to guide the path of movement of said movable press head relative to said guiding plate and to transmit movement of said guiding plate to such press head.

9. In a vulcanizer press, a fixed supporting structure, a pair of relatively movable complementary press heads, supporting and actuating means for one of said press heads comprising means for moving such head toward and away from the other head, a movable guiding plate, means movably mounting said guiding plate on said supporting structure, means functionally responsive to opening movement of the press for imparting movement to said guiding plate, and means connecting said guiding plate to said movable press head operable to guide the path of movement of said movable press head relative to said guiding plate and to transmit movement of said guiding plate to such press head.

10. In a vulcanizer press, a fixed supporting structure, a pair of relatively movable press heads, supporting and actuating means for one of said heads comprising means for moving such head toward and away from the other head, means guiding the path of movement of said movable head relative to said supporting structure comprising a slotted guiding plate movably mounted on said supporting structure, and parts on said movable head having engagement in said slots, and means functionally responsive to opening movement of said press for imparting movement to said plate, said parts being operative to transmit movement of said plate to said movable press head.

11. In a mold press, the combination of an upper and a lower mold section complementary to each other, means for moving said upper section toward and away from said lower section, a side plate fixed to the base of said press, a slotted plate movably carried by said side plate, guiding members on said upper section having engagement in said slots, and means responsive to opening movement of said press for shifting said slotted plate relatively to said side plate, said guiding members being operable to transmit movement of said slotted plate to said upper section.

12. In a curing press, the combination of an upper and a lower mold section complementary to each other, a pair of side plates respectively positioned on opposite sides of said upper mold section and having cam slots therein, guide members on said upper mold section fitting in said cam slots, a pair of pivotally mounted side arms supporting said upper mold section, racks on said side arms disposed on an arc about said pivotal point, pinions engaging said racks, and power means to rotate said pinions.

13. In a mold press, the combination of an upper and a lower mold section complementary to each other, a pair of pivotally mounted side arms supporting said upper mold section, means for tilting said side arms, a pair of side plates fixedly attached to the base of said press, slotted plates movably attached to the inner sides of said side plates, cam followers on said upper mold section fitting in said slots and means for shifting said slotted plates relatively to said side plates during opening movement of the press.

14. In a vulcanizer press, a plurality of pairs of relatively movable complementary press heads, supporting and actuating means comprising means for moving one of said heads in each of said pairs toward and away from its complementary head, a movable guiding member for each of said pairs, operating means functionally responsive to opening movement of the press for imparting movement to said guiding member, and means connecting said guiding member to said movable head for transmitting movement of said guiding member to said movable press head, and means interconnecting all of said operating means to prevent operation of the same when one of said operating means is inoperative to respond to opening movement of the press.

15. In a vulcanizer press, a plurality of pairs of relatively movable complementary press heads, supporting and actuating means comprising means for moving one of said heads in each of said pairs toward and away from its complementary head, a movable guiding member for each of said pairs, cooperating camming parts respectively on said guiding member and said actuating means functionally responsive to opening movement of said press for imparting movement to said guiding member, and means connecting said guiding member to said movable head for transmitting movement of said guiding member to said movable press head, and means interconnecting said camming parts to prevent operation of said guiding members when one of said camming parts is inoperative to functionally respond to opening movement of the press.

16. In a vulcanizer press, a plurality of pairs of relatively movable complementary press heads, supporting and actuating means comprising means for moving one of said heads in each of said pairs toward and away from its complementary head, the combination of separate guiding means for each of said pairs comprising a stationary member, a guide member movably supported on said stationary member, cooperating camming parts respectively on said guide member and actuating means responsive to operation of said actuating means for imparting movement to said guide member, and means connecting the movable head in each of said pairs to its associated guide member for transmitting movement of said guide member to said head, and means interconnecting said camming parts to prevent operation of said guide members when one of said camming parts is inoperative to functionally respond to operation of said actuating means.

17. The combination with the movable head in a press, of guiding means therefor comprising a stationary member, a guide member movably supported on said stationary member and movable relative to said press head, means interconnecting said movable guiding member and said movable press head determining a fixed path of relative movement therebetween and means for shifting the relative positions of said stationary member and said movable guide member to shift bodily the said path relatively to said stationary member.

18. In a vulcanizer press, the combination of a supporting structure and paired press heads, power means for moving one of said heads toward and away from the other head, means guiding the path of movement of said movable head relative to said supporting structure comprising a guiding structure movably mounted on said supporting structure, means interconnecting said movable guiding structure and said movable head, and means functionally responsive to relative movement between said press heads to change the relative position of said guiding structure with respect to said supporting structure and consequently varying the path of movement of said movable press head.

19. A vulcanizer press comprising a base, two pairs of mating mold sections, each such pair comprising a lower stationary mold and an upper movable mold, a separate press head for each upper mold section, trunnions on opposite sides of each of said press heads, a toggle member to which all of said trunnions are secured, a pair of side strain arms each pivotally secured at their upper ends to said toggle member on a common axis, a third strain arm likewise pivotally secured at its upper end to said toggle member on the same axis, all of said strain arms pivotally secured to said base on a common axis below said lower press head, said third strain arm arranged intermediately of said pairs of mold sections and means for actuating said strain arms pivotally about said lower axis.

20. In a curing press, the combination of upper and lower relatively movable press heads, a toggle linkage for moving the upper of said heads toward and away from the lower press head, said linkage comprising a first link pivotally secured at one end to said upper press head and a second link pivotally secured to the other end of said first link and at a pivot below said lower head, said links of such length that they are in substantial parallel overlying relationship when the press is closed, a rack on said second link disposed in an arc about said last named pivot point, a pinion in mesh with said rack, means rotatably supporting said pinion, and means for rotating said pinion.

21. In a curing press, the combination of two complementary mold sections, a pair of pivotally mounted side arms supporting one of said mold sections, racks on said side arms disposed on an arc about said pivotal point, pinions engaging said racks, and power means to rotate said pinions.

22. In a curing press, the combination of an upper and a lower mold section complementary to each other, said lower mold section being fixedly mounted, a pair of pivotally mounted side arms supporting said upper mold section, racks on said side arms disposed on an arc about said pivotal point, pinions engaging said racks, and power means to rotate said pinions.

23. In a vulcanizer press, a fixed supporting structure and a pair of relatively movable complementary press heads, supporting and actuating means for one of said press heads comprising means for moving such head toward and away from the other head, a movable guiding member, means connecting said guiding member to said supporting structure for guiding the movement of said guiding member relative to said supporting structure, and means connecting said guiding member to said movable press head for guiding the movement of said movable press head relative to said guiding member.

JAMES W. BRUNDAGE.